US009222388B2

(12) United States Patent
Kregling et al.

(10) Patent No.: US 9,222,388 B2
(45) Date of Patent: Dec. 29, 2015

(54) UREA COMMON RAIL

(71) Applicant: Tenneco Automotive Operating Company Inc., Lake Forest, IL (US)

(72) Inventors: Dana Kregling, Battle Creek, MI (US); Michael Golin, Dexter, MI (US); Guanyu Zheng, Grass Lake, MI (US); Alan Brockman, Ann Arbor, MI (US); Adam J. Kotrba, Laingsburg, MI (US); Timothy P. Gardner, Canton, MI (US); Andrey Factor, Farmington Hills, MI (US)

(73) Assignee: Tenneco Automotive Operating Company Inc., Lake Forect, IL (US)

( * ) Notice: Subject to any disclaimer, the term of this patent is extended or adjusted under 35 U.S.C. 154(b) by 26 days.

(21) Appl. No.: 13/780,279

(22) Filed: Feb. 28, 2013

(65) Prior Publication Data

US 2014/0238504 A1  Aug. 28, 2014

(51) Int. Cl.
*F01N 3/00* (2006.01)
*F01N 3/20* (2006.01)

(52) U.S. Cl.
CPC ........... *F01N 3/2066* (2013.01); *F01N 2260/02* (2013.01); *F01N 2610/02* (2013.01); *F01N 2610/144* (2013.01); *F01N 2610/1466* (2013.01);

(Continued)

(58) Field of Classification Search
CPC ........... F01N 3/08; F01N 3/00; F01N 3/2066; F01N 2610/02; F01N 2610/1466; F01N 2610/1473; F01N 2610/1486; F01N 2610/1493; F01N 2610/144; F01N 2260/02; B01D 53/90; F02M 41/00; F02M 47/027; F02M 57/005; F02M 43/00; F02M 59/36; F02M 63/004; F02M 63/0028; F02M 63/029; F02M 63/025; F02D 41/402; F02D 41/3809; F02D 41/3836; G01M 15/09
USPC ........ 60/272–324; 137/101.31; 239/124, 125; 123/445, 456, 457, 468, 469, 447, 514; 422/170, 168, 173, 169, 310
See application file for complete search history.

(56) References Cited

U.S. PATENT DOCUMENTS 3,596,640 A * 8/1971 Bloomfield .................... 123/493
5,339,787 A   8/1994 Jungquist et al.

(Continued)

FOREIGN PATENT DOCUMENTS

EP  0441401 A1  8/1991
EP  1752632 A1  2/2007

(Continued)

*Primary Examiner* — Thomas Denion
*Assistant Examiner* — Kelsey Stanek
(74) *Attorney, Agent, or Firm* — Harness, Dickey & Pierce, P.L.C.

(57) ABSTRACT

An exhaust system including a selective catalytic reduction (SCR) component and an oxidation catalyst component. The exhaust system also includes an exhaust treatment fluid injection system for dispersing an exhaust treatment fluid into an exhaust stream at a location adjacent either the SCR component or the oxidation catalyst component, wherein the exhaust treatment fluid injection device includes a common rail that provides the exhaust treatment fluid under pressure to a plurality of injectors that dose the exhaust treatment fluid into the exhaust stream. The exhaust treatment fluid injection device also includes a return rail for returning unused exhaust treatment fluid to the fluid source. Each of the common rail and return rail can be configured to allow drainage of the exhaust treatment fluid as a freeze-protection feature.

25 Claims, 6 Drawing Sheets

Figure 1:
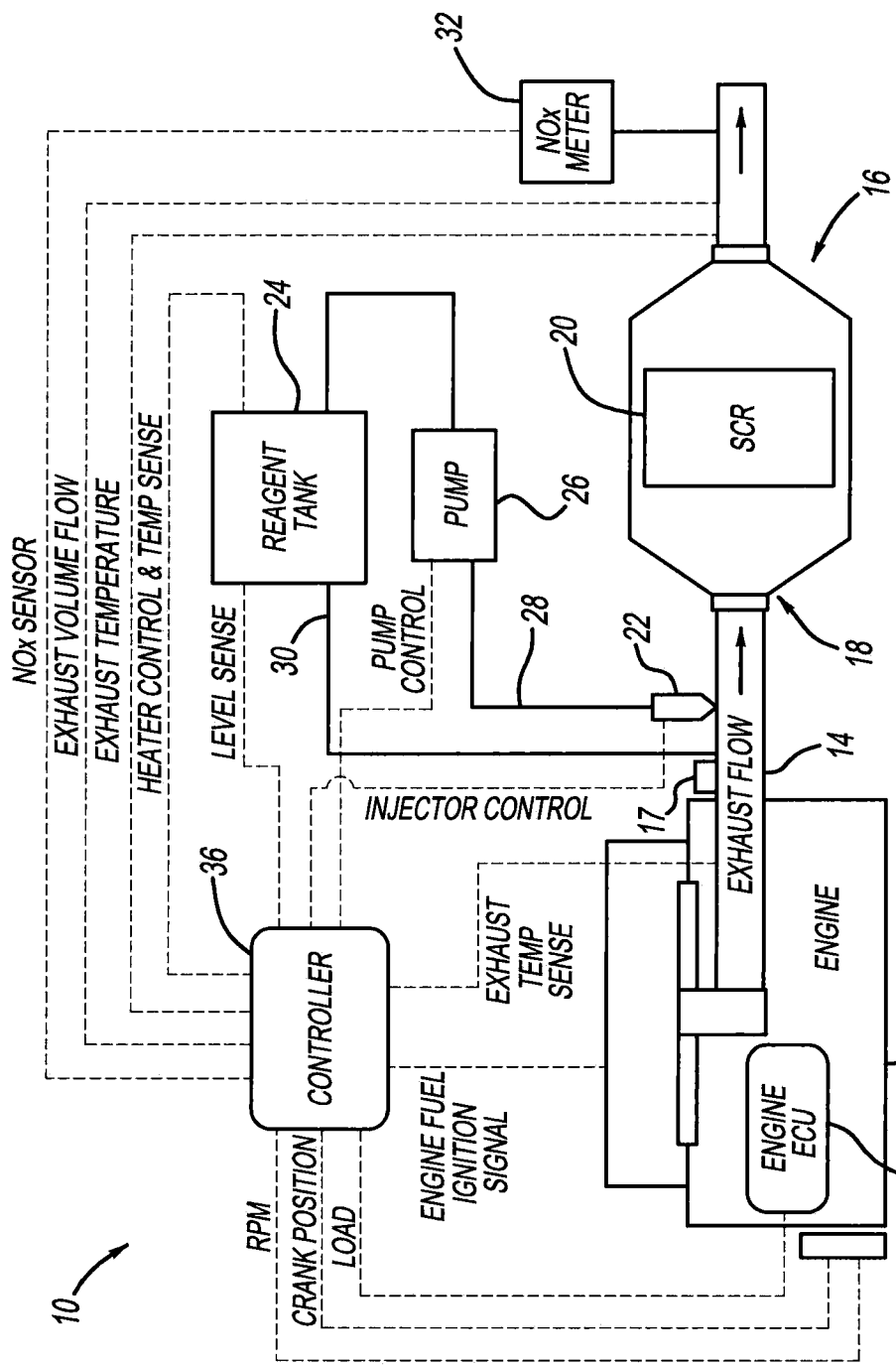

(52) U.S. Cl.
CPC . *F01N 2610/1473* (2013.01); *F01N 2610/1486* (2013.01); *F01N 2610/1493* (2013.01); *Y02T 10/24* (2013.01); *Y10T 137/2541* (2015.04)

(56) References Cited

U.S. PATENT DOCUMENTS

| | | | |
|---|---|---|---|
| 5,976,475 | A | 11/1999 | Peter-Hoblyn et al. |
| 6,050,088 | A | 4/2000 | Brenner |
| 6,125,629 | A * | 10/2000 | Patchett ............ 60/286 |
| 6,182,444 | B1 | 2/2001 | Fulton et al. |
| 6,779,339 | B1 * | 8/2004 | Laroo et al. ............ 60/297 |
| 6,820,417 | B2 * | 11/2004 | May et al. ............ 60/297 |
| 6,996,975 | B2 | 2/2006 | Radhamohan et al. |
| 7,040,290 | B2 * | 5/2006 | Kim ............ 123/456 |
| 7,264,785 | B2 | 9/2007 | Blakeman et al. |
| 7,591,132 | B2 | 9/2009 | Viola |
| 7,654,080 | B2 | 2/2010 | Ripper et al. |
| 7,757,662 | B2 * | 7/2010 | Cooke ............ 123/447 |
| 7,788,908 | B2 | 9/2010 | Rapp et al. |
| 7,958,721 | B2 | 6/2011 | Craig et al. |
| 8,109,077 | B2 | 2/2012 | Reba et al. |
| 8,297,046 | B2 | 10/2012 | Bandl-Konrad et al. |
| 2005/0002843 | A1 | 1/2005 | Kim et al. |
| 2005/0142409 | A1 * | 6/2005 | Cho et al. ............ 429/26 |
| 2007/0163239 | A1 | 7/2007 | Hofmann et al. |
| 2008/0053069 | A1 * | 3/2008 | Cox et al. ............ 60/285 |
| 2009/0159049 | A1 * | 6/2009 | Sakagami et al. ............ 123/456 |
| 2009/0229258 | A1 | 9/2009 | Zapf et al. |
| 2010/0139260 | A1 | 6/2010 | Rodman et al. |
| 2010/0319324 | A1 * | 12/2010 | Mital ............ 60/286 |
| 2011/0061374 | A1 | 3/2011 | Noritake |
| 2011/0138787 | A1 | 6/2011 | Radillo et al. |
| 2011/0197569 | A1 | 8/2011 | Salanta et al. |
| 2012/0073264 | A1 * | 3/2012 | Li et al. ............ 60/274 |
| 2012/0210697 | A1 | 8/2012 | Garimella et al. |

FOREIGN PATENT DOCUMENTS

| | | |
|---|---|---|
| JP | 2002-068735 A | 3/2002 |
| JP | 2008-286096 | 11/2008 |
| JP | 2010-046579 A | 3/2010 |
| JP | 2010-285950 | 12/2010 |
| JP | 4628392 | 2/2011 |
| WO | WO-2010-048794 A1 | 5/2010 |

* cited by examiner

UREA COMMON RAIL

FIELD

The present disclosure relates to a selective catalytic reductant injection system for an exhaust system.

BACKGROUND

This section provides background information related to the present disclosure which is not necessarily prior art.

Emission regulation requirements are mandating that engines have exhaust after-treatment systems to eliminate, or at least substantially minimize, the emission of, for example, particulate matter and $NO_x$. To eliminate or reduce the emission of particulate matter and $NO_x$, exhaust after-treatment systems can include components such as a particulate filter (e.g., a diesel particulate filter (DPF)), a selective catalyst reduction (SCR) component, and a diesel oxidation catalyst (DOC) component.

SCR and DOC components generally work in conjunction with reductant dosing systems that dose a reductant into the exhaust stream to treat the exhaust before the exhaust enters the SCR or DOC components. In the case of SCR, a reductant solution including urea is dosed into the exhaust stream before entry into the SCR component. In the case of DOC, a hydrocarbon reductant such as diesel fuel is dosed into the exhaust stream before entry into the DOC component.

The dosing systems for each of SCR and DOC exhaust after-treatments involve the integration of dosing modules, pumps, filters, regulators, and other necessary control mechanisms to control the dosing of each of these reductants into the exhaust stream. What distinguishes each of these systems is that hydrocarbon reductants do not freeze, while aqueous urea reductants can freeze in cold temperatures. A urea reductant dosing system, therefore, may require various components or configurations that assist in preventing the urea reductant from freezing in the dosing system, which can damage components of dosing system, or prevent the dosing system from properly dosing the urea reductant into the exhaust stream.

SUMMARY

This section provides a general summary of the disclosure, and is not a comprehensive disclosure of its full scope or all of its features.

The present disclosure provides an exhaust system including an exhaust treatment component; a tank for holding an exhaust treatment fluid; and an exhaust treatment fluid dosing system for dispersing the exhaust treatment fluid into an exhaust stream at a location adjacent the exhaust treatment component. The exhaust treatment fluid dosing system includes a common rail that provides the exhaust treatment fluid under pressure to a plurality of dosing modules that dose the exhaust treatment fluid into the exhaust stream, and includes a return rail for returning unused exhaust treatment fluid to the tank. In accordance with the present disclosure, at least one of the common rail and the return rail is configured to include a portion positioned at a height greater than another portion thereof such that any unused exhaust treatment fluid will drain therefrom.

The present disclosure also provides an exhaust after-treatment system including an exhaust passage; at least one exhaust treatment component located in the exhaust passage; a plurality of dosing modules for dosing an exhaust treatment fluid into an exhaust stream passing through the exhaust passage; and a common rail for providing the exhaust treatment fluid to each of the dosing modules. The common rail is divided into a first pair of rails that are each arranged to allow gravity-assisted drainage of the exhaust treatment fluid therefrom. The exhaust after-treatment system also includes a return rail for receiving the exhaust treatment fluid from each of the dosing modules. The return rail is divided into a second pair of rails that are each arranged to allow gravity-assisted drainage of the exhaust treatment fluid therefrom.

The present disclosure also provides an exhaust after-treatment system including an exhaust passage configured to divide into a plurality of legs; an exhaust treatment device disposed in each of the legs; a plurality of dosing modules for dosing an exhaust treatment fluid into the exhaust passage, wherein at least one of the plurality of dosing modules is associated with a corresponding leg of the exhaust passage; a common rail configured to provide the exhaust treatment fluid to each of the dosing modules; a return rail configured to receive unused exhaust treatment fluid from each of the dosing modules; and a plurality of valves configured to control entry of exhaust from the exhaust passage into each of the plurality of legs. In accordance with the present disclosure, at least one of the common rail and the return rail is configured to include a portion positioned at a height greater than another portion thereof such that any unused exhaust treatment fluid will drain therefrom.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
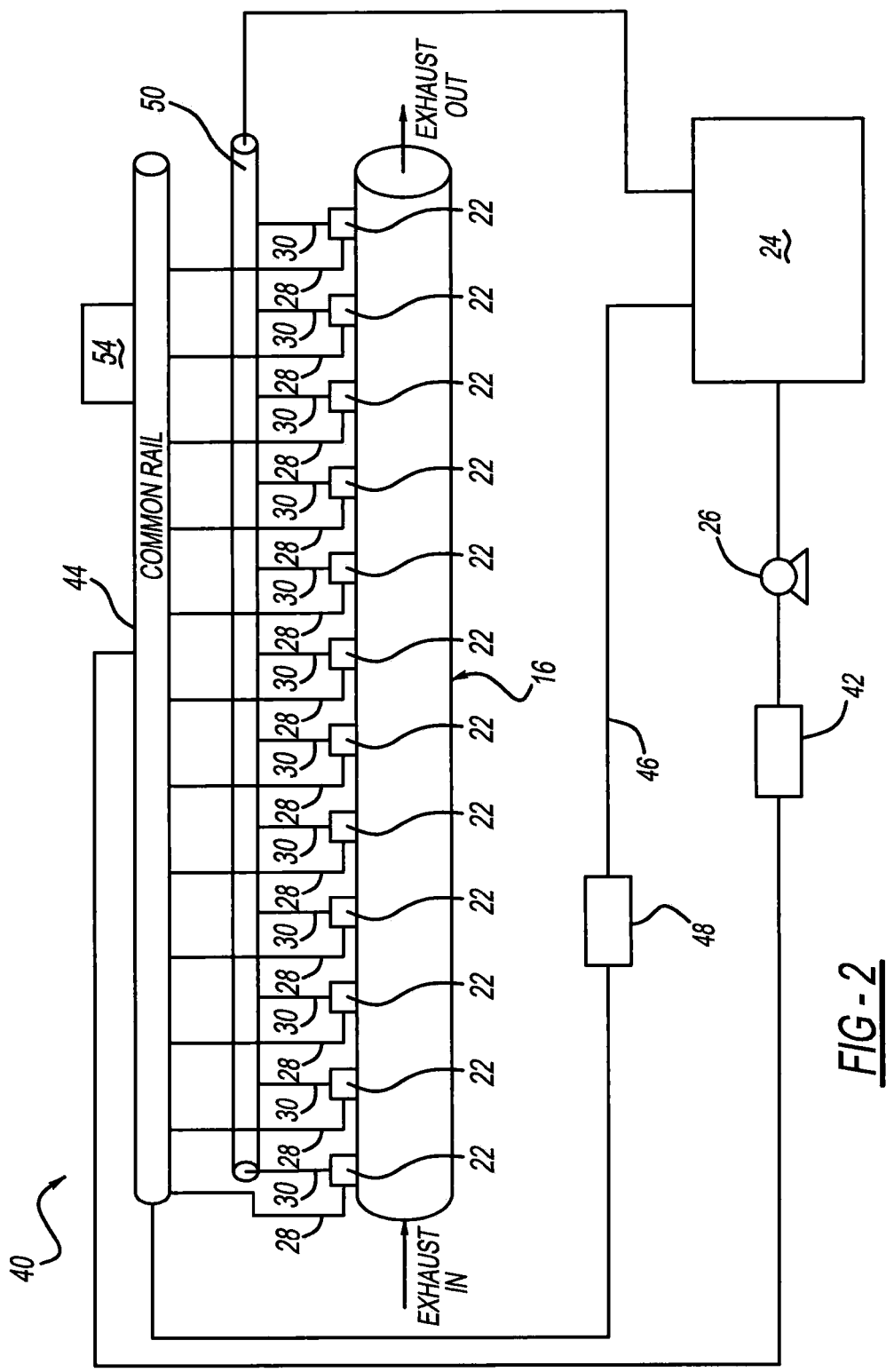
Figure 3:
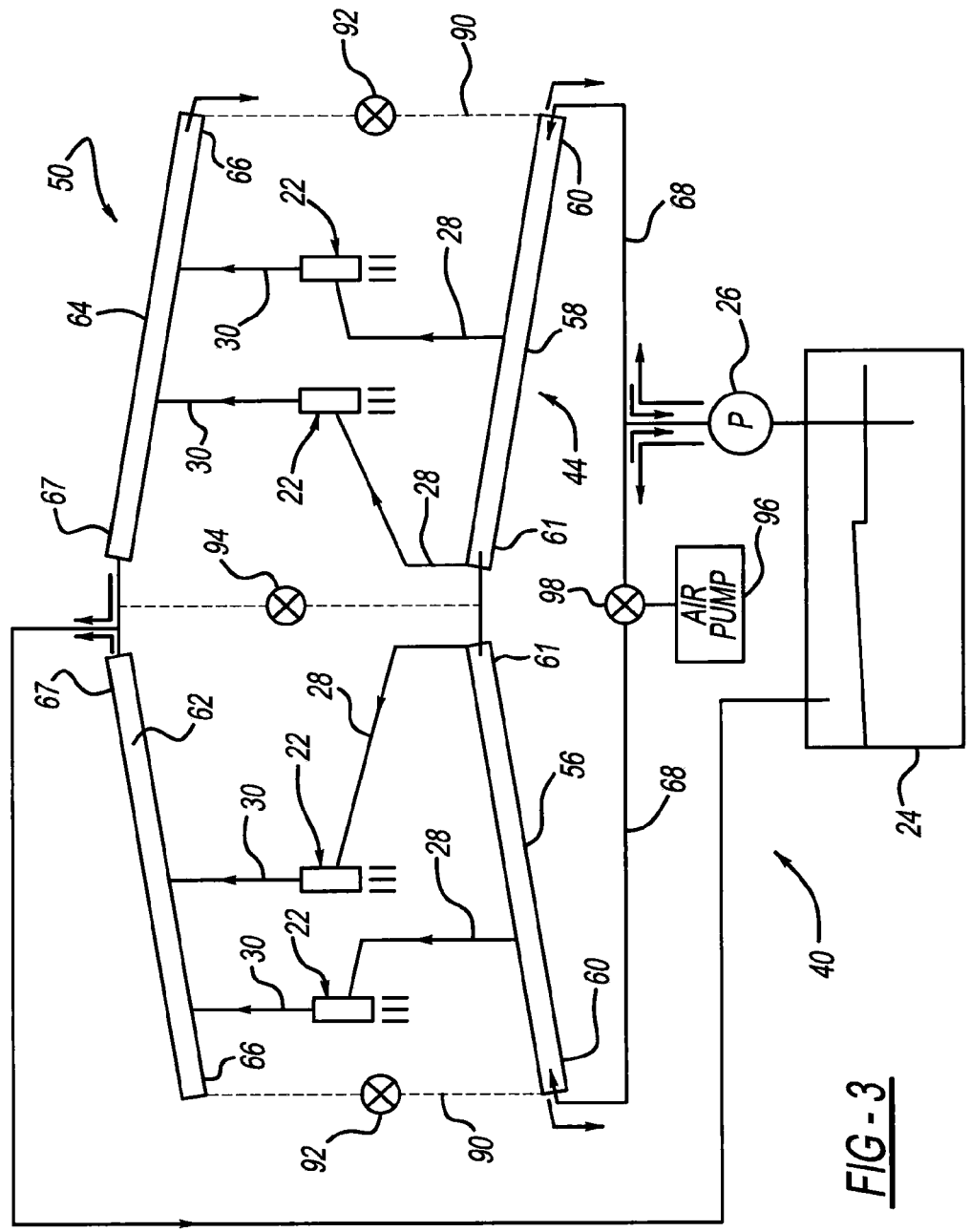
Figure 4:
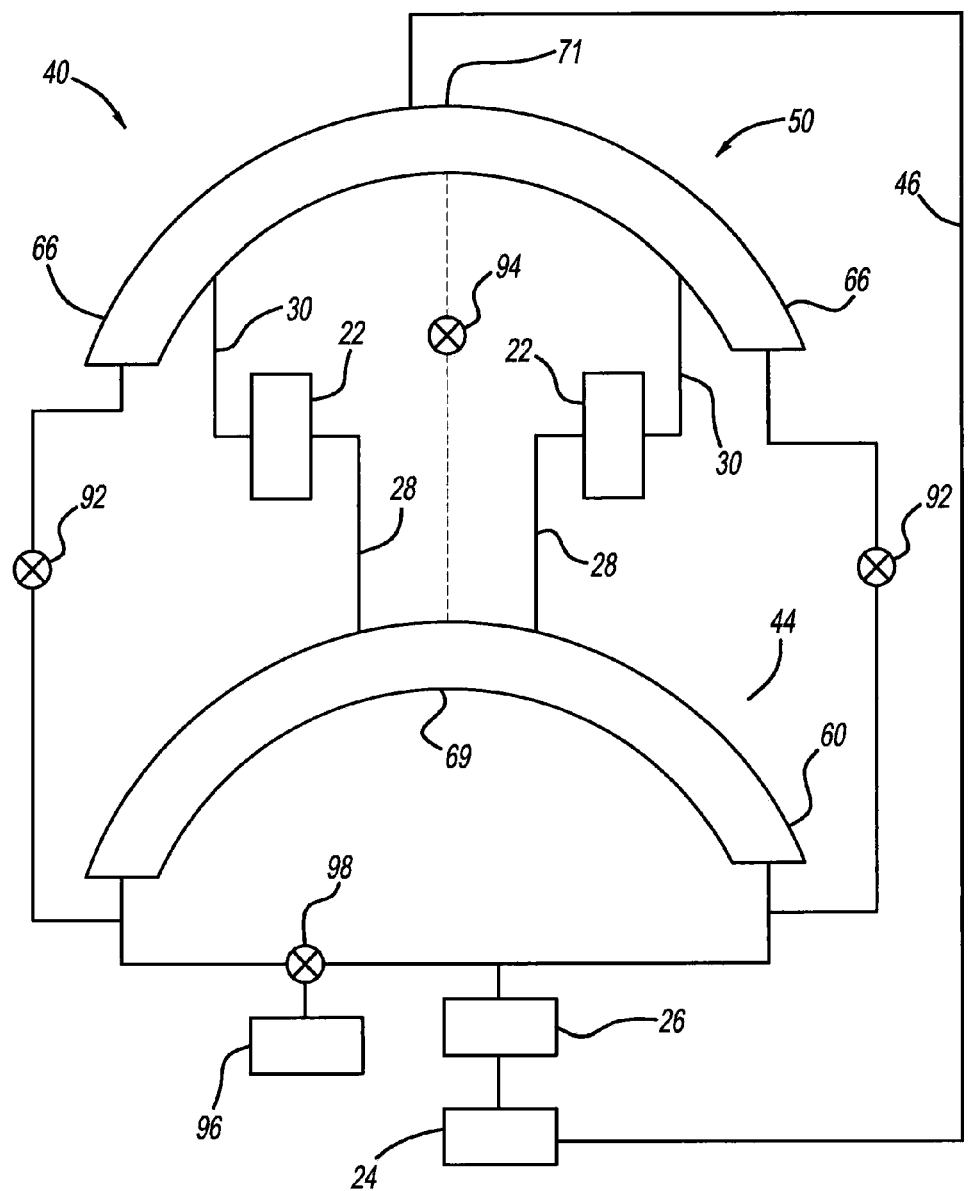
Figure 5:
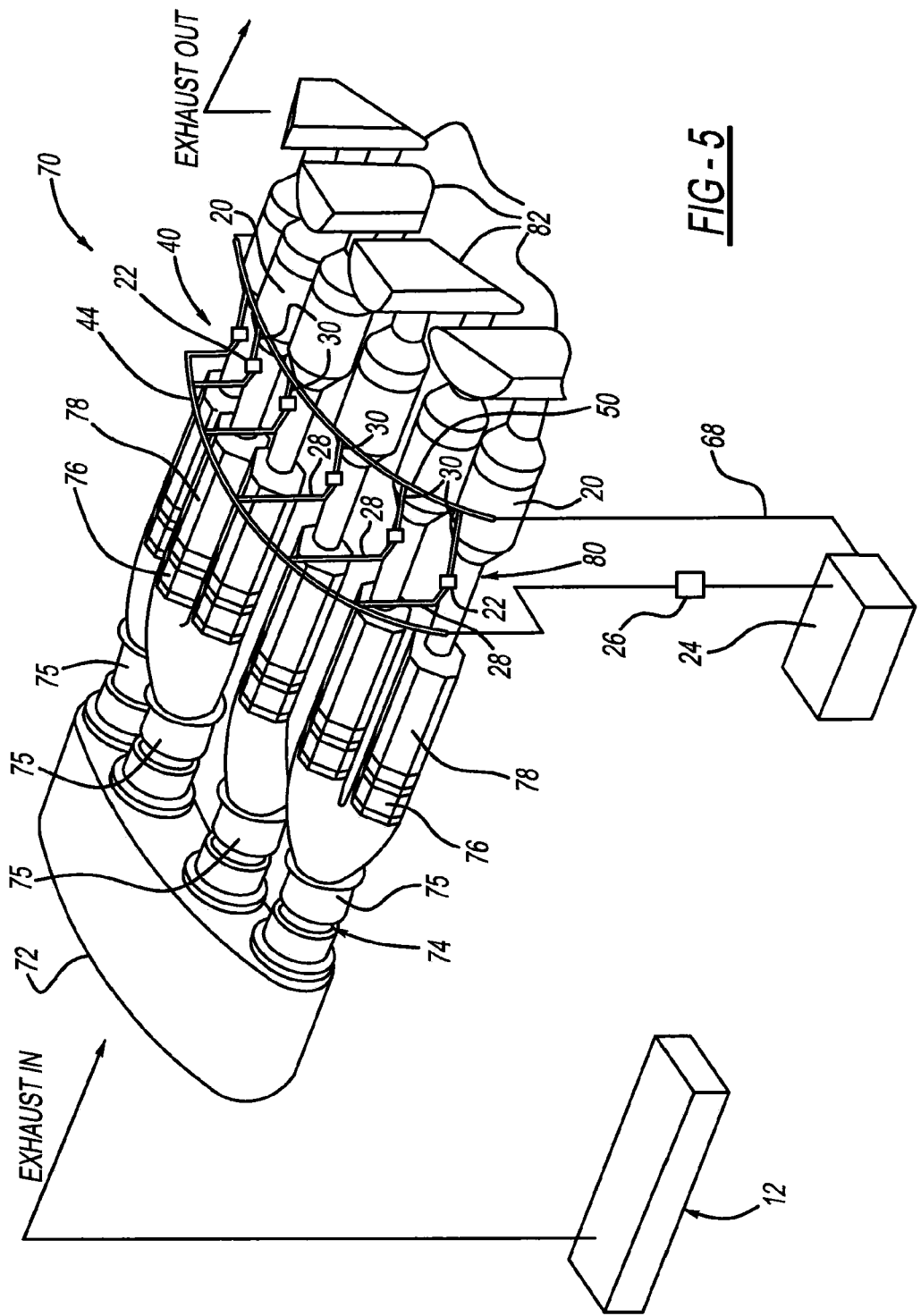
Figure 6:
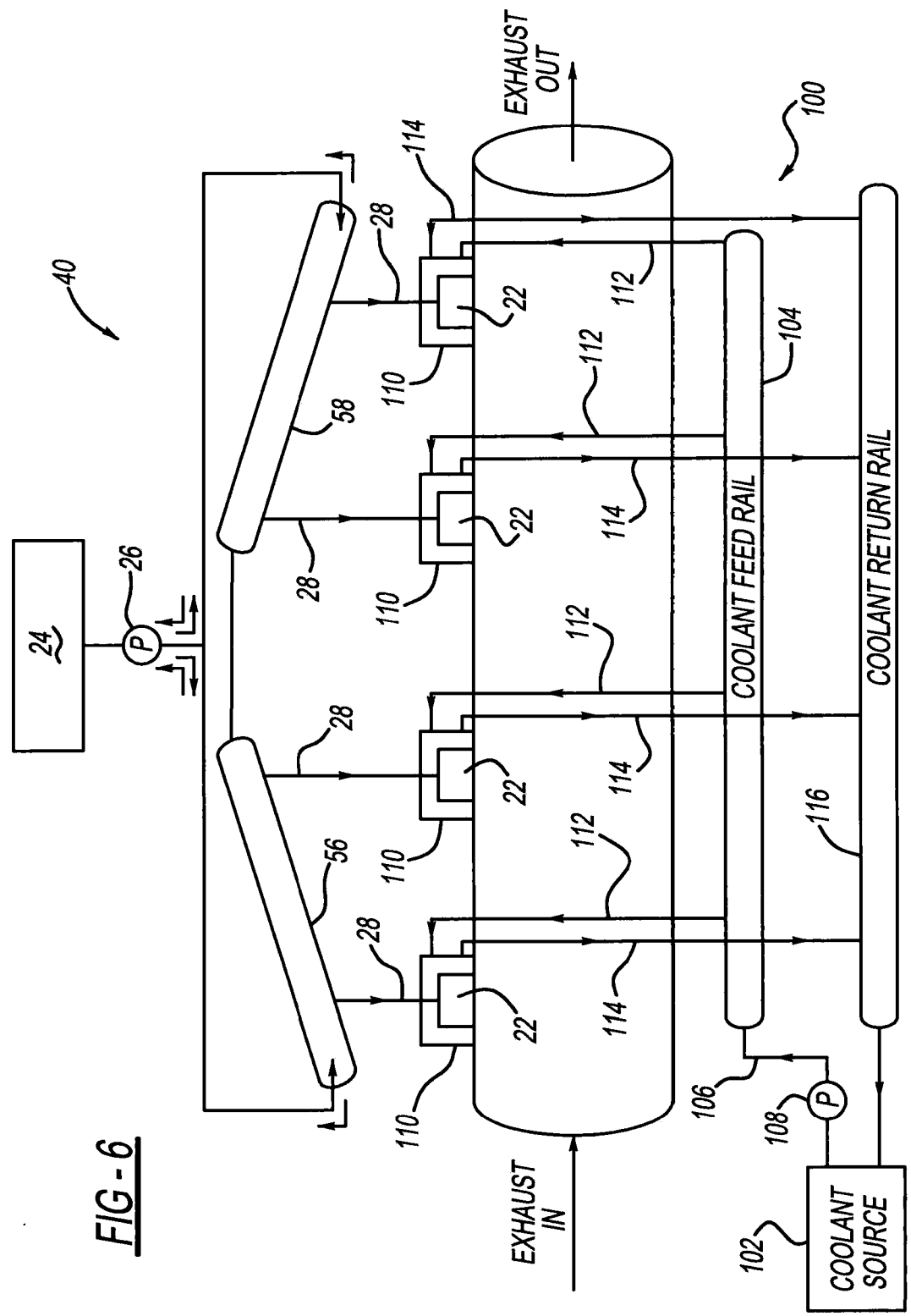

FIG. 1 schematically illustrates an exhaust treatment system according to a principle of the present disclosure;

FIG. 2 schematically illustrates a common rail dosing system for dosing a selective catalytic reductant into an exhaust stream according to a principle of the present disclosure;

FIG. 3 schematically illustrates a common rail dosing system according to a principle of the present disclosure;

FIG. 4 schematically illustrates a common rail dosing system according to a principle of the present disclosure;

FIG. 5 illustrates a large scale exhaust treatment system including a common rail injection system according to principles of the present disclosure; and FIG. 6 schematically illustrates a common rail dosing system including a cooling system according to the present disclosure.

Corresponding reference numerals indicate corresponding parts throughout the several views of the drawings.

DETAILED DESCRIPTION

Example embodiments will now be described more fully with reference to the accompanying drawings.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 24 having an exhaust after-treatment system 16. Downstream from engine 12 can be disposed an exhaust treatment component 18, which can be a DOC, a DPF component, or, as illustrated, a SCR component 20. Although not required by the present disclosure, exhaust after-treatment system 16 can further include components such as a thermal enhancement device or burner 17 to increase a temperature of the exhaust gases passing through exhaust passage 24. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment component 18 is a DPF.

To assist in reduction of the emissions produced by engine 12, exhaust after-treatment system 16 can include a dosing module 22 for periodically dosing an exhaust treatment fluid into the exhaust stream. As illustrated in FIG. 1, dosing module 22 can be located upstream of exhaust treatment component 18, and is operable to inject an exhaust treatment fluid into the exhaust stream. In this regard, dosing module 22 is in fluid communication with a reagent tank 24 and a pump 26 by way of inlet line 28 to dose an exhaust treatment fluid such as diesel fuel or urea into the exhaust passage 24 upstream of exhaust treatment component 20. Dosing module 22 can also be in communication with reagent tank 24 via return line 30. Return line 30 allows for any exhaust treatment fluid not dosed into the exhaust stream to be returned to reagent tank 24. Flow of the exhaust treatment fluid through inlet line 28, dosing module 22, and return line 30 also assists in cooling dosing module 22 so that dosing module 22 does not overheat. As will be described later, dosing modules 22 can be configured to include a cooling jacket (FIG. 6) that passes a coolant around dosing module 22 to cool it.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 32 may be positioned downstream from SCR 20. $NO_x$ sensor 32 is operable to output a signal indicative of the exhaust $NO_x$ content to an engine control unit 34. All or some of the engine operating parameters may be supplied from engine control unit 34 via the engine/vehicle databus to a reagent electronic dosing controller 36. The reagent electronic dosing controller 36 could also be included as part of the engine control unit 34. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 22. Accordingly, although only a single dosing module 22 is illustrated for urea dosing, it should be understood that multiple dosing modules 22 for urea injection are contemplated by the present disclosure. When multiple dosing modules 22 are used, however, the exhaust system 10 can experience pressure fluctuations.

To effectively supply exhaust treatment fluid to the exhaust stream using multiple dosing modules 22, the present disclosure utilizes a plurality of dosing modules 22 in fluid communication with a common rail that serves as a distributor of fluid and avoids pressure fluctuations arising from individual dosing module activations and deactivations. FIG. 2 schematically illustrates a selective catalytic reductant rail injection system 40 that can be used for supplying a urea exhaust treatment fluid to the exhaust stream.

As shown in FIG. 2, common rail injection system 40 is operable to inject a urea exhaust treatment fluid into the exhaust stream. Common rail injection system 40 generally includes reagent tank 24 from which a urea exhaust treatment fluid can be drawn by pump 26 through filter 42. Although filter 42 is illustrated as being downstream from pump 26, it should be understood that filter 42 can be located upstream from pump 26 without departing from the scope of the present disclosure. Pump 26, in addition to being operable to draw urea treatment fluid from reagent tank 24, is also operable to pressurize a common rail 44 and dosing module inlet lines 28 that are each in communication with dosing modules 22. In the illustrated exemplary embodiment, common rail injection system 40 includes twelve dosing modules 22. It should be understood that although twelve dosing 22 are illustrated in FIG. 2, a greater or less number of dosing modules 22 is contemplated, dependent on the application in which common rail injection system 40 is to be utilized.

The urea exhaust treatment fluid is fed from common rail 44 into dosing module inlet lines 28 and then into dosing modules 22, from which the urea exhaust treatment fluid is then dosed into the respective exhaust passages 14. Dosing modules 22 can also be provided with return lines 30 that each feed into a return rail 50. As set forth above, return lines 30 are advantageous in that dosing modules 22 may require a constant supply of fluid flowing through them to stay cool and function properly. Exhaust treatment fluid passing from inlet line 28, through dosing module 22, and into return lines 30, therefore, provides a sufficient cooling effect to dosing modules 22. Because return rail 50 communicates with reagent tank 24, any unused exhaust treatment fluid present in return rail 50 is returned to reagent tank 24.

Furthermore, downstream from common rail 44 can be positioned an overflow line 46. Within overflow line 46 can be positioned a backpressure regulator 48. Overflow line 46 provides a relief path for the urea exhaust treatment fluid during operation of common rail system 40. During operation of common rail system 40, a high volume of urea exhaust treatment fluid may be fed into common rail 44. To prevent backpressure from building in common rail system 40, excess urea exhaust treatment fluid can be fed into overflow line 46 and through backpressure regulator 48. That is, when a sufficient amount of pressure builds in common rail system 40, a valve (not shown) in backpressure regulator 48 will open and allow the excess urea exhaust treatment fluid to pass back into reagent tank 24. Further, backpressure regulator 48 prevents excessive backpressure from acting on pump 26, which allows pump 26 to run at full capacity without stalling or resonating.

Dosing modules 22 may be activated simultaneously or in a staggered manner. To activate and deactivate dosing modules 22 either simultaneously or in a staggered manner, common rail injection system 40 can controller 36 (FIG. 1) can be operable to control the timing of each dosing module 22, operate pump 26, and monitor pressure sensors 52. Regarding the timing of each dosing module 22, all dosing modules 22 may be activated simultaneously, or groups of dosing modules 22 (e.g., groups of two, four, or six) may be activated while the remaining dosing modules 22 are deactivated. Activation of groups of dosing modules 22 can assist in reducing pressure fluctuations in system 40.

Common rail injection system 40 can also include an accumulator 54, if desired. Accumulator 54 assists in pressure fluctuations in common rail injection system 40. Accumulator 54 may be used in combination with backpressure regulator 48, or may be used in place of backpressure regulator 48, without departing from the scope of the present disclosure.

Because the urea treatment fluid can freeze, common rail injection system 40 may require purging when not in use. As noted above, pump 26 is a reversible pump that, when common rail injection system 40 is not being used, can pump the urea treatment fluid from common rail 44 and inlet lines 28 back into reagent tank 24. Simply running pump 26 in reverse, however, can sometimes be insufficient to completely purge injector return lines 30, which leaves the return lines 30 susceptible to rupture if any urea treatment fluid remains in the return lines 30 during freezing conditions.

To further assist in the purging of the urea treatment fluid from common rail injection system 40 during non-use thereof, common rail 44 can be configured to allow drainage of unused exhaust treatment. For example, referring to FIG. 3, common rail 44 can be divided into a pair of rails 56 and 58 that are each angled in a manner to allow any unused exhaust treatment fluid to be pulled by gravity in a direction towards reagent tank 24. More particularly, common rail 44 can be divided into a first rail 56 and a second rail 58, with each of the first and second rails 56 and 58 being angled to allow the exhaust treatment fluid therein, when rails 56 and 58 are not pressurized, to flow towards ends 60 of the first and second rails 56 and 58. Upon actuation of pump 26 in reverse, the exhaust treatment fluid located at each end 60 can be drawn back to tank 24 through inlet lines 68.

It should be understood that each rail 56 and 58 can be configured such that at least one end 60 is located a height that is less than a height of an opposing end 61. By arranging each rail 56 and 58 in this manner, any unused exhaust treatment fluid can flow from opposing end 61 to end 60 to ensure that no unused exhaust treatment fluid will remain in common rail 44 when common rail 44 is not in use.

To ensure that exhaust treatment fluid does not remain in return rail 50, return rail 50 can also be divided into a pair of rails 62 and 64 that are also angled in a manner to allow any unused exhaust treatment fluid to be pulled by gravity in a direction towards reagent tank 24. That is, exhaust treatment fluid will flow under the pull of gravity towards ends 66, where the exhaust treatment fluid will subsequently feed back into outlet lines 90 that can be connected to inlet lines 68 through valves 92 to reagent tank 24. More specifically, when pump 26 is instructed to run a purge by controller 36, a signal may also be sent to valves 92 to open outlet lines 90 such that return rails 62 and 64 can be purged. Similar to common rail 44, it should also be understood that each rail 62 and 64 of return rail 50 can be configured such that at least one end 66 is located a height that is less than a height of an opposing end 67. By arranging each rail 62 and 64 in this manner, any unused exhaust treatment fluid can flow from opposing end 67 to end 66 to ensure that no unused exhaust treatment fluid will remain in return rail 50 when common rail dosing system 40 is not in use.

Common rail injection system 40 can also, optionally, include an air-purge system including an air-purge valve 94 and an air pump 96. In this regard, during an air purge, air can be pumped into inlet lines 68 through a valve 98, which generally remains closed if air pump 96 is not being used. As air enters common rail system 40, fluid is pushed through common rails 56 and 58, through injectors 22, and return rails 62 and 64 and forced back to tank 24. Then, to remove air in common rail system 40, air purge valve 94 can be opened to allow the air in common rail injection system 40 to be expelled from the system 40.

As an alternative to dividing common rail 44 and return rail 50 into a pair of rails that are angled to assist in purging the exhaust treatment fluid therefrom, common rail 44 and return rail 50 can be configured in different orientations that also serve to assist in gravity purge. Referring to FIG. 4, common rail 44 and return rail 50 can be arch-shaped. The arch-shaped configuration of common rail 44 allows the exhaust treatment fluid therein, when common rail 44 is not pressurized, to flow towards ends 60 of common rail 44, wherein any exhaust treatment fluid that accumulates at ends 60 can drain into inlet lines 28 of dosing modules 22 located at each end 60. Upon actuation of pump 26 in reverse, the exhaust treatment fluid located in each inlet line 28 can be pulled through dosing module 22 and return lines 30 into return rail 50. Because return rail 50 can be arch-shaped as well, exhaust treatment fluid will flow under the pull of gravity towards ends 66, where the exhaust treatment fluid will subsequently feed into outlet lines 68 to reagent tank 24. Similar to the configuration illustrated in FIG. 3, a central portion 69 and 71 of common rail 44 and return rail 50, respectively, is positioned at a height that is greater than ends 60 and 66 to ensure that the exhaust treatment fluid will properly drain from each rail.

Although FIG. 4 illustrates an arch-shaped configuration for each of common rail 44 and return rail 50, the present disclosure should not be limited thereto. More particularly, additional configurations such as, for example, a V-shaped common rail 44 and return rail 50 are contemplated so long as the configuration selected for common rail 44 and return rail 50 allows for gravity to assist in purging exhaust treatment fluid from common rail 44 and return rail 50.

In addition to assisting in purging unused exhaust treatment fluid from common rail 44 and return rail 50, the dividing of common rail 44 and return rail 50 into a pair of rails, or reconfiguration of common rail 44 and return rail 40 into shapes that allow for gravity-assisted purging, also assists in overcoming packaging restrictions within the locomotive that may prevent the use of a linear pipe as common rail 44 and return rail 50. Rather, the common rails 48 and 44 may be modular or curved to account for any packaging restrictions present during design of exhaust system 100. In this regard, common rails 48 and 44 may include various legs connected together in various orientations to account for the packaging restrictions. The modular design of common rails 48 and 44 does not significantly affect performance of common rails, including the abatement of pressure fluctuations.

Now referring to FIG. 5, an exhaust system 70 for, for example, a locomotive is illustrated including common rail injection system 40. Exhaust system 70 includes a diesel-powered engine 12 that can feed exhaust into an exhaust turbo manifold 72. Downstream from turbo manifold 72, the exhaust stream is split into a plurality of exhaust passages 74. Each exhaust passage 74 is in communication with a plurality of exhaust treatment components including an array of DOCs 76 and DPFs 78. In the illustrated embodiment, each exhaust passage 74 communicates with an array of three DOCS 76 and three DPFs 78. After exiting the DOCS 76 and DPFs 78, the exhaust stream is passed into exhaust passages 80. At exhaust passages 80, common rail injection system 40 is disposed where urea treatment fluid is injected into the exhaust stream at a location upstream of SCRs 20 such that after the urea treatment fluid is injected into the exhaust stream at exhaust passages 80, the exhaust stream travels through SCRs 20. After passing through SCRs 20, the treated exhaust exits exhaust system 70 through outlets 82.

It should be understood that each exhaust passage 74 can include a valve 75 disposed therein for controlling exhaust flow through exhaust system 70. For example, during periods of low exhaust flow (e.g., during idling or low engine load), it may be unnecessary to have exhaust flowing through each passage 74, and having the urea reductant solution being dosed at each dosing module 22. As such, valves 75 can be closed in selected exhaust passages 74 to prevent flow therethrough. If a selected exhaust passage 74 is closed, the dosing modules 22 associated with that exhaust passage 74 will, in turn, be prevented from dosing reductant into the exhaust passage 80 to prevent unnecessary use of reductant.

Valves 75 can also be actuated during periods of regeneration of DPFs 78. That is, if a DPF 78 is being regenerated, it may be desirable to re-route the exhaust through legs 74 where a DPF 78 is not being regenerated. Alternatively, if a respective dosing module 22 is determined to be malfunctioning, it may also be desirable to prevent exhaust from passing by that dosing module 22. If such a case occurs, valve 75 can close the exhaust passage 74 that leads to the malfunctioning dosing module 22. Valves 75 can be controlled by controller 36 or ECU 34, without limitation.

Now referring to FIG. 6, common rail injection system 40 can include a cooling system 100 that is fed with a coolant from coolant source 102. In the configuration illustrated in FIG. 6, exhaust treatment fluid is provided to each dosing module 22 through inlet lines 28. Dosing modules 22, however, do not include return lines 30. Accordingly, there is no need for return rail 50. Dosing modules 22 that are not configured to include a return line 30 are generally known as "dead-head" dosing modules. Because dosing modules 22 do not include return lines 30, overheating of dosing modules 22 can become a concern.

To cool dosing modules 22, return rail 50 can be replaced by a cooling system 100. Cooling system 100 can include a cooling feed rail 104 that is provided with coolant from coolant source 102, which is fed through a coolant inlet line 106 using a coolant pump 108. Each dosing module 22 can be configured to include a cooling jacket 110 that is fed with coolant from coolant feed rail 104 through feed lines 112. After coolant passes through cooling jacket 110, coolant 102 can exit coolant jacket 110 through exit lines 114 to a cooling return rail 116. Coolant 102 is then free to return from cooling return rail 116 to coolant source 102. The coolant used can be any type of coolant known to one skilled in the art including anti-freeze solutions such as glycols. For example, coolant can be fed from the engine coolant system (not shown), if desired.

According to the above, the injection of exhaust treatment fluids for large-scale diesel applications can be effectively administered to the exhaust stream using multiple injectors without sacrificing spray quality and quantity. By using a plurality of dosing modules 22 in fluid communication with a common rail 44 that serves as a distributor of the fluid, pressure fluctuations arising from individual dosing module 22 activations and deactivations are avoided. This results in the proper amount and quality of reductant consistently being provided to the exhaust stream to reduce $NO_x$ from the exhaust stream. Moreover, as the configuration of common rail 44 and return rail 50 is such that any unused exhaust treatment fluid will drain from each, the exhaust aftertreatment system 16 is protected in freezing conditions that may damage elements of system 16. In the event that return lines 30 and return rail 50 are not utilized, common rail injection system 40 can include a cooling system 100 to effectively cool each dosing module 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust system, comprising:
    an exhaust treatment component;
    a tank for holding an exhaust treatment fluid;
    an exhaust treatment fluid dosing system for dispersing the exhaust treatment fluid into an exhaust stream at a location adjacent the exhaust treatment component, the exhaust treatment fluid dosing system including a fluid distributor positioned at a first height (H1) that provides the exhaust treatment fluid under pressure to a plurality of dosing modules positioned at a second height (H2) that dose the exhaust treatment fluid into the exhaust stream, and including a return positioned at a third height (H3) for returning unused exhaust treatment fluid to the tank, where H3>H2>H1;
    a valve positioned between and in fluid communication with each of the fluid distributor and the return, the valve being configured to allow a flow of the exhaust treatment fluid from the return to the fluid distributor before being returned to the tank during a purge operation of the exhaust treatment fluid dosing system; and
    a controller in communication with the valve, the controller configured to open the valve and allow the fluid communication between the return and the fluid distributor during the purge operation,
    wherein at least one of the fluid distributor and the return is configured to include a portion positioned at a fourth height (H4) greater than another portion thereof such that any unused exhaust treatment fluid will drain therefrom during the purge operation.

2. The exhaust system of claim 1, wherein at least one of the fluid distributor and return is divided into a first rail and a second rail, with each rail being configured to include a portion positioned at the height greater than the another portion thereof.

3. The exhaust system of claim 1, wherein at least one of the fluid distributor and the return is arch-shaped.

4. The exhaust system of claim 1, wherein the exhaust treatment fluid dosing system includes a pump for pressurizing the fluid distributor and for pressurizing inlet lines of the dosing module.

5. The exhaust system of claim 1, wherein the exhaust treatment fluid is a urea exhaust treatment fluid.

6. The exhaust system of claim 5, wherein the exhaust treatment component is a selective catalytic reduction component.

7. The exhaust system of claim 4, wherein the pump is reversible to purge the exhaust treatment fluid from the exhaust treatment fluid dosing system.

8. An exhaust after-treatment system, comprising:
    an exhaust passage;
    at least one exhaust treatment component located in the exhaust passage;
    a plurality of dosing modules for dosing an exhaust treatment fluid into an exhaust stream passing through the exhaust passage;
    a fluid distributor providing the exhaust treatment fluid to each of the dosing modules, the fluid distributor being divided into a first pair of legs that are each arranged to allow gravity-assisted drainage of the exhaust treatment fluid therefrom;
    a return, the return being divided into a second pair of legs that are each arranged to allow gravity-assisted drainage therefrom;

a first valve positioned between and in fluid communication with a first leg of the fluid distributor and a first leg of the return, the first valve being configured to allow a flow of the exhaust treatment fluid from the first leg of return to the first leg of the fluid distributor during a purging of the exhaust treatment fluid;

a second valve positioned between and in fluid communication with a second leg of the fluid distributor and a second leg of the return, the second valve being configured to allow a flow of the exhaust treatment fluid from the second leg of return to the second leg of the fluid distributor during the purging of the exhaust treatment fluid; and a controller in communication with each of the first and second valves, the controller configured to open the first and second valves and allow the fluid communication during the purging, wherein the first and second pairs of legs each include an end that is located at a height that is greater than a second end thereof.

9. The exhaust after-treatment system of claim 8, further comprising a cooling system including a coolant distributor that provides a coolant to cool each dosing module.

10. The exhaust after-treatment system of claim 8, further comprising a pump for pressurizing the fluid distributor and for pressurizing inlet lines of the dosing modules.

11. The exhaust after-treatment system of claim 8, wherein the exhaust treatment fluid is a urea exhaust treatment fluid.

12. The exhaust after-treatment system of claim 11, wherein the exhaust treatment component is a selective catalytic reduction component.

13. The exhaust system of claim 10, wherein the pump is reversible to purge the exhaust treatment fluid from the fluid distributor and the return during the purging.

14. An exhaust after-treatment system, comprising:
an exhaust passage configured to divide into a plurality of legs;
an exhaust treatment device disposed in each of the legs;
a plurality of dosing modules for dosing an exhaust treatment fluid into the exhaust passage, at least one of the plurality of dosing modules being associated with a corresponding leg of the exhaust passage;
a fluid distributor configured to provide the exhaust treatment fluid to each of the dosing modules and a return configured to receive unused exhaust treatment fluid from each of the dosing modules, the fluid distributor and the return being in fluid communication via a plurality of first valves located between the fluid distributor and the return during a purge of the exhaust treatment fluid from the fluid distributor, the plurality of dosing modules, and the return, the first valves being configured to allow a flow of the exhaust treatment fluid from the return to the fluid distributor during the purge;

a controller in communication with each of the first valves, the controller configured to open each of the first valves and allow the fluid communication between the return and the fluid distributor during the purge; and a plurality of second valves configured to control entry of exhaust from the exhaust passage into each of the plurality of legs, wherein at least one of the fluid distributor and the return is configured to include a portion positioned at a height greater than another portion thereof such that any unused exhaust treatment fluid will drain therefrom.

15. The exhaust after-treatment system of claim 14, wherein at least one of the fluid distributor and the return is divided into a first conduit and a second conduit, with each conduit being configured to include the portion positioned at the height greater than the another portion thereof.

16. The exhaust after-treatment system of claim 15, wherein at least one of the fluid distributor and the return is arch-shaped.

17. The exhaust after-treatment system of claim 14, further comprising a pump for pressurizing the fluid distributor and for pressurizing inlet lines of the dosing modules.

18. The exhaust after-treatment system of claim 14, wherein the exhaust treatment fluid is a urea exhaust treatment fluid.

19. The exhaust after-treatment system of claim 18, wherein the exhaust treatment component is a selective catalytic reduction component.

20. The exhaust after-treatment system of claim 17, wherein the pump is reversible to purge the exhaust treatment fluid from the fluid distributor, the dosing modules, and the return.

21. The exhaust after-treatment system of claim 14, wherein the controller is configured to control the second valves and each of the dosing modules.

22. The exhaust after-treatment system of claim 21, wherein the controller is operable to close each of the plurality of second valves during periods of reduced engine load, and if one of the second valves of a respective leg is closed, the controller is operable to prevent the dosing module associated with that leg from dosing the exhaust treatment fluid into the respective leg.

23. The exhaust system of claim 1, further comprising an air pump for air-purging the fluid distributor and return.

24. The exhaust after-treatment system of claim 8, further comprising an air pump for air-purging the fluid distributor and return.

25. The exhaust after-treatment system of claim 14, further comprising an air pump for air-purging the fluid distributor and return.

* * * * *

UNITED STATES PATENT AND TRADEMARK OFFICE
CERTIFICATE OF CORRECTION

PATENT NO. : 9,222,388 B2  
APPLICATION NO. : 13/780279  
DATED : December 29, 2015  
INVENTOR(S) : Kregling et al.

Page 1 of 1

It is certified that error appears in the above-identified patent and that said Letters Patent is hereby corrected as shown below:

Title Page, Column 1, (73), Assignee: Delete "Forect," and insert --Forest,--

Specification

| | |
|---|---|
| Col. 2, line 65 | : Delete "24" and insert --14-- |
| Col. 3, line 6 | : Delete "24." and insert --14.-- |
| Col. 3, line 21 | : Delete "24" and insert --14-- |
| Col. 3, line 22 | : Delete "20." and insert --18.-- |
| Col. 6, line 14 | : Delete "68" and insert --90-- |
| Col. 6, line 30 | : Delete "40" and insert --50-- |
| Col. 6, line 34 | : Delete "48" and insert --50-- |
| Col. 6, line 37 | : Delete "48" and insert --50-- |
| Col. 6, line 39 | : Delete "48" and insert --50-- |
| Col. 6, line 51 | : Delete "DOCS" and insert --DOCs-- |
| Col. 6, line 52 | : Delete "DOCS" and insert --DOCs-- |
| Col. 7, line 54-55 | : Delete "aftertreatment" and insert --after-treatment-- |

Signed and Sealed this  
Second Day of August, 2016

Michelle K. Lee  
*Director of the United States Patent and Trademark Office*